(12) United States Patent
Bae

(10) Patent No.: US 8,681,856 B2
(45) Date of Patent: Mar. 25, 2014

(54) SCALABLE VIDEO PROVIDING AND REPRODUCING SYSTEM AND METHODS THEREOF

(75) Inventor: Tae Meon Bae, Daegu (KR)

(73) Assignee: SK Planet Co., Ltd. (KR)

( * ) Notice: Subject to any disclaimer, the term of this patent is extended or adjusted under 35 U.S.C. 154(b) by 574 days.

(21) Appl. No.: 12/737,715

(22) PCT Filed: Nov. 12, 2008

(86) PCT No.: PCT/KR2008/006656
§ 371 (c)(1),
(2), (4) Date: Feb. 8, 2011

(87) PCT Pub. No.: WO2009/131286
PCT Pub. Date: Oct. 29, 2009

(65) Prior Publication Data
US 2011/0182353 A1 Jul. 28, 2011

(30) Foreign Application Priority Data

Apr. 24, 2008 (KR) .......................... 10-2008-0038404
Apr. 28, 2008 (KR) .......................... 10-2008-0039260

(51) Int. Cl.
*H04N 7/26* (2006.01)

(52) U.S. Cl.
USPC .................................................. 375/240.02

(58) Field of Classification Search
USPC ........................................ 375/240; 37/240.02
See application file for complete search history.

(56) References Cited

U.S. PATENT DOCUMENTS

| 2006/0023748 | A1* | 2/2006 | Chandhok et al. ............ 370/469 |
| 2006/0039480 | A1* | 2/2006 | Seo ........................... 375/240.24 |
| 2007/0016594 | A1* | 1/2007 | Visharam et al. ............. 707/100 |
| 2007/0022215 | A1* | 1/2007 | Singer et al. .................. 709/246 |
| 2008/0181298 | A1* | 7/2008 | Shi et al. .................. 375/240.03 |
| 2013/0121413 | A1* | 5/2013 | Hannuksela et al. .... 375/240.12 |

FOREIGN PATENT DOCUMENTS

| KR | 1020070022078 | 2/2007 |
| KR | 1020070052634 | 5/2007 |

* cited by examiner

*Primary Examiner* — William C Vaughn, Jr.
*Assistant Examiner* — Naod Belai
(74) *Attorney, Agent, or Firm* — Baker & Hostetler LLP

(57) ABSTRACT

Disclosed hereinafter is a scalable video providing system and method. The scalable video providing system of the present invention includes a terminal apparatus for, in the case in which a full SVC video, having a higher scalability than that of a base layer SVC video previously stored in the terminal apparatus, is to be displayed, transmitting a request query to request a enhancement layer svc bit stream, which is further required, to the outside based on the base layer SVC video; and a content providing server for, when the request query is received, searching for required pertinent content based on the request query and providing the enhancement layer svc bit stream, corresponding to the remaining scalable video other than the base layer SVC video of the searched content, to the terminal apparatus.

15 Claims, 7 Drawing Sheets

SCALABLE VIDEO PROVIDING AND REPRODUCING SYSTEM AND METHODS THEREOF

TECHNICAL FIELD

The present invention relates to a scalable video providing and displaying system, and more particularly, to a scalable video providing and displaying system, a scalable video providing and displaying method, a terminal apparatus, a content providing server, and a method of controlling the same, in which, when displaying more improved video than previously stored video under scalable video displaying environment, if only additional video for displaying the improved video is requested based on the previously stored video, a providing side searches a multimedia DB for an additional layer of pertinent content corresponding to the request or extracts the additional layer of the pertinent content corresponding to the request from the multimedia DB, and streams and provides the additional layer, and a displaying side displays the improved video based on the additional video streamed with the previously stored video, thereby effectively lowering the data transfer rate at the time of streaming and maintaining the reliability of additional video.

BACKGROUND ART

In recent years, as content, in particular, video content is actively exchanged (transmitted/received), a scheme for coding video in order to transmit/receive the video content effectively is developing in various ways. In particular, it is expected that video, which is coded using a Scalable Video Coding (hereinafter referred to as 'SVC') method standardized in accordance with H.264 Salable Extension, (hereinafter referred to as 'SVC video') may be employed a lot in the future.

SVC video is described below. The SVC video is video coded using the SVC method, and bit streams of the SVC video, which contribute to the resolution, the frame rate and the picture quality, respectively, can be divided. In accordance with the SVC method, the layer of SVC consists of one base layer, and one or more enhancement layers that can be consecutively stacked over the base layer. The enhancement layers can represent a maximum resolution, a maximum frame rate and a maximum picture quality, which are respectively given thereto, on the basis of lower layer information. In the SVC video, as the number of the enhancement layers consecutively stacked increases, a variety of resolutions, frame rates, and picture qualities can be supported.

Thus, a displaying apparatus for receiving and displaying the streamed SVC video can download, stream, receive and display the SVC video having an appropriate resolution, frame rate and picture quality depending on the state of a network (for example: the transfer rate) or its own conditions (for example: displaying specification). In particular, a displaying apparatus that displays an SVC video can selectively download or stream and display the SVC video of a low resolution, a low frame rate and a low picture quality (hereinafter referred to as a 'base layer SVC video') or an SVC video of a high resolution, a high frame rate and a high picture quality (hereinafter referred to as a 'full svc video') depending on the state of a network.

A displaying apparatus that can selectively display the base layer svc video or the full svc video as described above displayed and stored the base layer svc video in the past, but, as the state of a network is improved, full svc video is streamed, over a network if it is sought to display the improved quality video.

However, in the case in which the quality improved video is to be displayed in the state in which the base layer svc video is stored as described above, the base layer svc video previously stored, including the same contents, is never used, and the entire improved quality(resolution) improved new video is streamed and received. Accordingly, problems arise because the data transfer rate is very high and the resources of a network are consumed a lot.

Further, in existing video, a user can search for a desired video based on information, such as a title (or players), resolution, and picture quality of video, as metadata information. However, in the case of SVC, the entire SVC video can be described in existing video form. However, in order to search for respective sub-bit streams constituting the SVC video, new metadata information, including additional fields, is required. That is, in order to display an improved picture quality while having some bit streams of existing SVC(base layer SVC bit stream), SVC sub-bit streams for the improved picture quality(enhancement layer svc bit stream) are required, and new metadata can be employed in order to search a multimedia DB for the SVC sub-bit streams.

DISCLOSURE OF INVENTION

Technical Problem

Objects to be solved by a scalable video providing system and method are as follows.

The present invention has been made in view of the above problems occurring in the prior art, and an object of the present invention is to provide a scalable video providing system, including a terminal apparatus for, in the case in which a full SVC video, having a higher scalability than that of a base layer SVC video previously stored in the terminal apparatus, is to be displayed, transmitting a request query to request a enhancement layer svc bit stream, which is further required, to the outside based on the base layer SVC video, and a content providing server for, when the request query is received, searching for required pertinent content based on the request query and providing the enhancement layer svc bit stream, corresponding to the remaining scalable video other than the base layer SVC video of the searched content, to the terminal apparatus. Accordingly, the data transfer rate can be lowered effectively at the time of improved video streaming. Further, content, having the same coding condition as that of the base layer SVC video, can be searched for, and the enhancement layer svc bit stream according to the searched content can be provided to the terminal apparatus.

Another object to be achieved by the present invention is to provide a content providing server for providing a scalable video, including a query receiving unit for receiving a specific request query from a specific terminal apparatus over an external network, a query analysis unit for, when the request query is received from the query receiving unit, searching for required pertinent content based on the request query, a video extraction unit for extracting a enhancement layer svc bit stream corresponding to the remaining scalable video other than a base layer SVC video, which was previously stored in the terminal apparatus, from the searched content based on the request query, and a video transfer unit for transmitting the enhancement layer svc bit stream to the terminal apparatus over the network. Accordingly, the data transfer rate at the time of improved video streaming can be lowered effectively, and reliability of the enhancement layer svc bit stream can be also maintained.

Still another object to be achieved by the present invention is to provide a scalable video providing method, including the steps of, in the case in which a full SVC video, having a higher scalability than that of a base layer SVC video previously stored in a terminal apparatus, is to be displayed, the terminal apparatus transmits a request query to request a enhancement layer svc bit stream, which is further required, to an external content providing server based on the base layer SVC video, when the request query is received, the content providing server searches for required pertinent content based on the request query, and the content providing server extracts the enhancement layer svc bit stream, corresponding to the remaining scalable video other than the base layer SVC video of the searched content, and provides the extracted enhancement layer svc bit stream to the terminal apparatus. Accordingly, the data transfer rate at the time of improved video streaming can be lowered effectively, and reliability of the enhancement layer svc bit stream can be also maintained.

Further still another object to be achieved by the present invention is to provide a method of controlling a terminal apparatus, including the steps of, in the case in which a full SVC video, having a higher scalability than that of a base layer SVC video that was previously stored, is to be displayed, transmitting a request query for requesting a enhancement layer svc bit stream that is further required to an external content providing server based on the base layer SVC video, and when the enhancement layer svc bit stream is received from the content providing server, processing the base layer SVC video and the enhancement layer svc bit stream and outputting the full SVC video. Accordingly, the data transfer rate at the time of improved video streaming can be lowered effectively, and reliability of the enhancement layer svc bit stream can be also maintained.

Meanwhile, objects to be solved by the system and method for streaming and displaying a scalable video according to the present invention are as follows.

An object to be achieved by the present invention is to provide a video displaying apparatus for displaying scalable videos, including a video storage unit in which a base layer SVC video was previously stored, a video processing unit for reading the base layer SVC video stored in the video storage unit, aligning a enhancement layer svc bit stream, streamed and provided by an external providing server, and the read base layer SVC video to one, and outputting a full SVC video, and a displaying control unit for, in the case in which the full SVC video having a higher scalability than that of the base layer SVC video previously stored is to be displayed, requesting the enhancement layer svc bit stream from the external providing server based on the base layer SVC video read by the video processing unit, or a system for streaming and displaying a scalable video, including the above-described video displaying apparatus and a providing server for providing scalable videos. Accordingly, the data transfer rate at the time of improved video streaming can be lowered effectively.

Another object to be achieved by the present invention is to provide a method of streaming and displaying a scalable video, including the steps of, in the case in which a full SVC video having a higher scalability than that of a base layer SVC video previously stored is to be displayed, a video displaying apparatus requesting a enhancement layer svc bit stream from an external providing server based on the base layer SVC video, the providing server streaming and providing the requested enhancement layer svc bit stream, the video displaying apparatus aligning the enhancement layer svc bit stream, streamed and provided by the providing server, and the base layer SVC video previously stored into the one full SVC video, and displaying the aligned full SVC video. Accordingly, the data transfer rate at the time of improved video streaming can be lowered effectively.

Still another object to be achieved by the present invention is to provide a scalable video displaying method by a video displaying apparatus, including the steps of, in the case in which a full SVC video having a higher scalability than that of a base layer SVC video previously stored is to be displayed, reading the base layer SVC video and requesting a enhancement layer svc bit stream from an external providing server based on the read base layer SVC video, aligning the enhancement layer svc bit stream, streamed by the external providing server in response to the request, and the read base layer SVC video, and outputting the aligned full SVC video. Accordingly, the data transfer rate at the time of improved video streaming can be lowered effectively.

Technical Solution

To achieve the above objects, the scalable video providing system and method according to the present invention has the following constructions and technical characteristics.

The scalable video providing system of the present invention may include a terminal apparatus for, in the case in which a full SVC video, having a higher scalability than that of a base layer SVC video previously stored in the terminal apparatus, is to be displayed, transmitting a request query to request a enhancement layer svc bit stream, which is further required, to the outside based on the base layer SVC video, and a content providing server for, when the request query is received, searching for required pertinent content based on the request query and providing the enhancement layer svc bit stream, corresponding to the remaining scalable video other than the base layer SVC video of the searched content, to the terminal apparatus.

Preferably, the scalable video may include an SVC video coded using an SVC method.

The terminal apparatus of the present invention may include a video storage unit in which a base layer SVC video was previously stored, a video processing unit for, when a enhancement layer svc bit stream is received from an external content providing server, processing the base layer SVC video stored in the video storage unit and the enhancement layer svc bit stream and outputting a full SVC video, a video control unit for, in the case in which the full SVC video having a higher scalability than that of the base layer SVC video that was previously stored in the video storage unit is to be displayed, outputting request content information for requesting the enhancement layer svc bit stream, which is further required, based on the base layer SVC video, and a request unit for generating a request query to request the enhancement layer svc bit stream based on the request content information and transmitting the generated request query to the content providing server.

Preferably, the request unit may include a request query generating unit for generating the request query to request the enhancement layer svc bit stream based on the request content information output from the video control unit, and a request query transmitting unit for transmitting the request query, generated from the request query generating unit, to the content providing server over an external network.

Preferably, the request query may include at least any one of content name information, content codec information, encoding parameter information and scalability information, which correspond to the base layer SVC video, and scalability information of the full SVC video for which reproduction is required.

Preferably, the video processing unit may read the base layer svc video stored in the video storage unit, align Network Abstraction Layer (NAL) units of the second SVC video, which is streamed and provided by the content providing server, and NAL units of the read base layer svc video on the basis of a time stamp, and output the full svc video.

Preferably, the terminal apparatus may further include a video receiving unit for receiving a scalable video, streamed and provided by the external content providing server, from the external content providing server, and outputting NAL units included in a packet of the scalable video to the video processing unit.

The content providing server of the present invention may include a query receiving unit for receiving a specific request query from a specific terminal apparatus over an external network, a query analysis unit for, when the request query is received from the query receiving unit, searching for required pertinent content based on the request query, a video extraction unit for extracting a enhancement layer svc bit stream corresponding to the remaining scalable video other than a base layer SVC video, which was previously stored in the terminal apparatus, from the searched content based on the request query, and a video transfer unit for transmitting the enhancement layer svc bit stream to the terminal apparatus over the network.

Preferably, the request query received from the terminal apparatus may include at least any one of content name information, content codec information, encoding parameter information and scalability information, corresponding to the base layer SVC video previously stored in the terminal apparatus, and scalability information of a full SVC video corresponding to the content.

Preferably, the query analysis unit may search for the full SVC video, corresponding to the pertinent content, based on at least any one of the content name information, the content codec information, the encoding parameter information, and the scalability information of the requested full SVC video, which are included in the request query, and output pieces of information included in the request query to the video extraction unit.

Preferably, the video extraction unit may extract the enhancement layer svc bit stream corresponding to the remaining scalable video by removing NAL units according to the scalability information of the base layer SVC video from the searched full SVC video, based on the scalability information of the base layer SVC video of the pieces of information included in the request query received from the query analysis unit, and output the extracted enhancement layer svc bit stream.

Preferably, the content providing server may further include a content DB for storing pieces of content corresponding to at least one scalable video having different scalabilities and providing the pertinent content, searched for by the query analysis unit, to the video extraction unit.

Preferably, the content stored in the content DB may include metadata, including at least any one of its own content codec information, encoding parameter information and scalability information.

A scalable video providing method of the present invention may include the steps of, in the case in which a full SVC video, having a higher scalability than that of a base layer SVC video previously stored in a terminal apparatus, is to be displayed, the terminal apparatus transmits a request query to request a enhancement layer svc bit stream, which is further required, to an external content providing server based on the base layer SVC video, when the request query is received, the content providing server searches for required pertinent content based on the request query, and the content providing server extracts the enhancement layer svc bit stream, corresponding to the remaining scalable video other than the base layer SVC video of the searched content, and provides the extracted enhancement layer svc bit stream to the terminal apparatus.

A method of controlling a terminal apparatus of the present invention may include the steps of, in the case in which a full SVC video, having a higher scalability than that of a base layer SVC video that was previously stored, is to be displayed, transmitting a request query for requesting a enhancement layer svc bit stream that is further required to an external content providing server based on the base layer SVC video, and, when the enhancement layer svc bit stream is received from the content providing server, processing the base layer SVC video and the enhancement layer svc bit stream and outputting the full SVC video.

Preferably, the step of transmitting the request query may include the steps of outputting request content information for requesting the enhancement layer svc bit stream, which is further required, based on the base layer SVC video, generating the request query to request the enhancement layer svc bit stream based on the request content information, and transmitting the generated request query to the content providing server over an external network.

Preferably, the request query may include at least any one of content name information, content codec information, encoding parameter information and scalability information, which correspond to the base layer SVC video, and scalability information of the full SVC video for which reproduction is required.

A method of controlling a content providing server according to the present invention may include the steps of, when a specific request query is received from a specific terminal apparatus over an external network, searching for pertinent content that is required based on the request query, extracting a enhancement layer svc bit stream corresponding to the remaining scalable video other than a base layer SVC video, which was previously stored in the terminal apparatus, from the searched content based on the request query, and transmitting the extracted enhancement layer svc bit stream to the terminal apparatus over the network.

Preferably, the searching step may include searching for a full SVC video corresponding to the pertinent content, based on at least any one of content name information, content codec information, encoding parameter information, and scalability information of the full SVC video, which are included in the request query.

Preferably, the extracting step may include the step of extracting the enhancement layer svc bit stream corresponding to the remaining scalable video by removing NAL units according to the scalability information of the base layer SVC video from the full SVC video, based on the scalability information of the base layer SVC video included in the request query.

Meanwhile, a system and method for streaming and displaying a scalable video according to the present invention has the following constructions and technical characteristics in order to achieve the above-described objects.

The system for streaming and displaying a scalable video according to the present invention may include a providing server for providing the scalable video; and a video displaying apparatus may include a video storage unit in which a base layer SVC video was previously stored, a video processing unit for reading the base layer SVC video stored in the video storage unit, aligning a enhancement layer svc bit stream, streamed and provided by the providing server, and the read base layer SVC video to one full SVC video, and outputting the full SVC video, and a displaying control unit for, in the case in which the full SVC video having a higher scalability than that of the base layer SVC video previously stored is to be displayed, requesting the enhancement layer svc bit stream from the providing server based on the base layer SVC video read by the video processing unit.

Preferably, the scalable video may include an SVC video coded using an SVC method.

Preferably, in the case in which additional NAL unit information for displaying the full svc video, having a higher scalability than that of the base layer svc video that previously stored, is received from the video displaying apparatus, the providing server may stream the second SVC video corresponding to the received additional NAL unit information and provide the streamed second SVC video to the video displaying apparatus.

A video displaying apparatus of the present invention may include a video storage unit in which a base layer SVC video was previously stored, a video processing unit for reading the base layer SVC video stored in the video storage unit, aligning a enhancement layer svc bit stream, streamed and provided by an external providing server, and the read base layer SVC video to one, and outputting a full SVC video, and a displaying control unit for, in the case in which the full SVC video having a higher scalability than that of the base layer SVC video previously stored is to be displayed, requesting the enhancement layer svc bit stream from the external providing server based on the base layer SVC video read by the video processing unit.

Preferably, the displaying control unit may include a video request unit for requesting the enhancement layer svc bit stream from the external providing server, and a video control unit for, in the case in which the full SVC video having a higher scalability than that of the base layer SVC video previously stored is to be displayed, controlling the video request unit to request the enhancement layer svc bit stream based on the base layer SVC video read by the video processing unit, and controlling a read timing of the video processing unit based on video information of the full SVC video processed in the video processing unit.

Preferably, the video processing unit may include a video reader unit for reading the base layer SVC video stored in the video storage unit, and a video analysis unit for aligning the enhancement layer svc bit stream, streamed and provided by the external providing server, and the base layer SVC video read by the video reader unit to one, outputting the full SVC video, and outputting video information of the full SVC video to the displaying control unit.

Preferably, the video displaying apparatus may further include a plurality of layer decoders for decoding scalable videos in response to respective scalabilities, and an extraction unit for receiving the full SVC video from the video processing unit and providing the full SVC video to a layer decoder, corresponding to a scalability of the full SVC video, of the plurality of layer decoders.

Preferably, the scalable video may include an SVC video coded using an SVC method.

Preferably, the video analysis unit of the video processing unit may output the full svc video in which NAL units of the second SVC video, streamed and provided by the external providing server, and NAL units of the read base layer svc video are aligned on the basis of a time stamp, analyze the full svc video, and output scalability information corresponding to video information of the full svc video to the displaying control unit.

Preferably, in the case in which the third SVC scalable video having a higher scalability than that of the first SVC scalable video previously stored is to be displayed, the video control unit of the displaying control unit may control the video request unit of the displaying control unit to request the second SVC video by providing additional NAL unit information for the second SVC video to the external providing server based on the base layer svc video read by the video processing unit, and control the video reader unit of the video processing unit to read the NAL units of the base layer svc video from the video storage unit on the basis of a reproduction timing of the full svc video based on the scalability information of the full svc video input from the video analysis unit.

Preferably, the video displaying apparatus may further include a video packet receiving unit for receiving a scalable video streamed and provided by the external providing server and outputting NAL units included in a packet of the scalable video to the video analysis unit.

Preferably, the scalability information may include at least any one of resolution information, frame rate information, picture quality information, and layer number information of the corresponding scalable video.

A streaming displaying method of the present invention may include the steps of, in the case in which a full SVC video having a higher scalability than that of a base layer SVC video previously stored is to be displayed, a video displaying apparatus requesting a enhancement layer svc bit stream from an external providing server based on the base layer SVC video, the providing server streaming and providing the requested enhancement layer svc bit stream, the video displaying apparatus aligning the enhancement layer svc bit stream, streamed and provided by the providing server, and the base layer SVC video previously stored into the one full SVC video, and displaying the aligned full SVC video.

Preferably, the scalable video may include an SVC video coded using an SVC method.

Preferably, the step of the providing server streaming and providing the requested enhancement layer svc bit stream may include the step of, in the case in which additional NAL unit information for displaying the full svc video having a higher scalability than that of the base layer svc video previously stored is received from the video displaying apparatus, streaming the second SVC video corresponding to the received additional NAL unit information and providing the streamed second SVC video to the video displaying apparatus.

A scalable video displaying method by a video displaying apparatus according to the present invention may include the steps of, in the case in which a full SVC video having a higher scalability than that of a base layer SVC video previously stored is to be displayed, reading the base layer SVC video and requesting a enhancement layer svc bit stream from an external providing server based on the read base layer SVC video, aligning the enhancement layer svc bit stream, streamed by the external providing server in response to the request, and the read base layer SVC video, and outputting the aligned full SVC video.

Preferably, the outputting step may include outputting the full SVC video to a layer decoder, corresponding to a scalability of the full SVC video, of a plurality of layer decoders for decoding scalable videos in response to respective scalabilities.

Preferably, the scalable video displaying method may further include the step of displaying the full SVC video decoded in the layer decoder.

Preferably, the scalable video may include an SVC video coded using an SVC method.

Preferably, the aligning step may include the steps of aligning NAL units of the second SVC video streamed and provided by the external providing server NAL units of the read base layer svc video on the basis of a time stamp, and analyzing the aligned full svc video and outputting scalability information corresponding to video information of the full svc video.

Preferably, the requesting step may include the step of requesting the second SVC video by providing additional NAL unit information for the full svc video to the external providing server based on the read base layer svc video.

Preferably, the scalable video displaying method may further include the step of controlling a read timing of NAL units of the base layer svc video previously stored based on the scalability information of the full svc video so that the NAL units of the base layer svc video are read on the basis of a reproduction timing of the full svc video.

Preferably, the scalability information may include at least any one of resolution information, frame rate information, picture quality information and layer number information of a corresponding scalable video.

Advantageous Effects

According to the scalable video providing system and method of the present invention, in the case in which an improved full svc video not a base layer svc video of a low resolution, a low frame rate and a low picture quality, which was previously stored, is to be displayed, only a second SVC video, which is further required in order to display the full svc video based on the previously stored base layer svc video, is streamed and provided by an external SVC content providing server. The base layer svc video and the second SVC video are aligned, and the aligned full svc video is displayed. Accordingly, the data transfer rate at the time of streaming may be lowered effectively.

Furthermore, according to the scalable video providing system and method of the present invention, in searching for/extracting second SVC video that is further required, not only a content name but also content corresponding to scalability information of a full svc video are searched for in consideration of a codec and encoding parameters according to the same standard as that of a base layer svc video, and the second SVC video is extracted from the content name and the content. Accordingly, since an optimal second SVC video suitable for being added to the base layer svc video may be provided to the terminal apparatus 100, reliability of the second SVC video may be maintained.

Furthermore, according to the system and method for streaming and displaying a scalable video according to the present invention, in the case in which an improved full svc video not a base layer svc video of a low resolution, a low frame rate and a low picture quality, which was previously stored, is to be displayed, only a second SVC video, which is further required in order to display the full svc video based on the previously stored base layer svc video, is streamed and provided by an external SVC content providing server. The base layer svc video and the second SVC video are aligned, and the aligned full svc video is displayed. Accordingly, the data transfer rate at the time of streaming may be lowered effectively.

MODE FOR THE INVENTION

The present invention will now be described in detail in connection with preferred embodiments with reference to the accompanying drawings.

Figure 1:
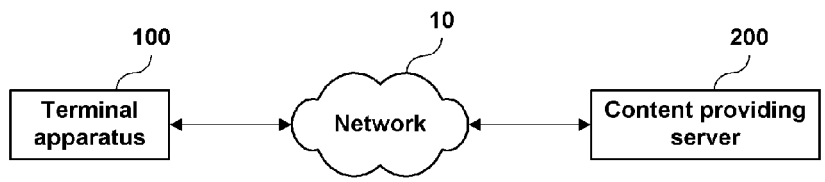
FIG. 1 is a schematic control block diagram of a scalable video providing system according to an embodiment of the present invention.

FIG. 1 is a schematic control block diagram of a scalable video providing system according to an embodiment of the present invention.

As shown in FIG. 1, a scalable video providing system according to the present invention includes a content providing server 200 for providing a scalable video, and a terminal apparatus 100 for receiving the scalable video, streamed by the content providing server 200, from the content providing server 200 over a network 10 and displaying the received scalable video.

The scalable video may include an SVC video coded using an SVC method. It is hereinafter assumed that the scalable video is an SVC video coded using an SVC method, and the content providing server 200 is an SVC content providing server 200 for streaming and providing an SVC video.

The SVC content providing server 200 streams content corresponding to an SVC video coded using an SVC method and provides the streamed content over the network 10. In the case in which a request query for displaying a full svc video, having a higher scalability than that of a base layer svc video that was previously stored in the terminal apparatus 100, is received from the terminal apparatus 100, the SVC content providing server 200 may search for pertinent content based on the request query, stream a second SVC video corresponding to the remaining scalable video other than the base layer svc video, of the searched pertinent content, and provide the second SVC video to the terminal apparatus 100.

The terminal apparatus 100 stores a base layer svc video previously. In the case in which the terminal apparatus 100 displays a full svc video having a higher scalability than that of the base layer svc video that was previously stored therein, the terminal apparatus 100 may provide a request query for requesting a second SVC video, which is further required, to the SVC content providing server 200 based on the previously stored base layer svc video, and display the full svc video based on the previously stored base layer svc video and the second SVC video streamed and provided by the SVC content providing server 200.

Hereinafter, a construction of the terminal apparatus 100 is described in detail with reference to FIG. 2.

Figure 2:
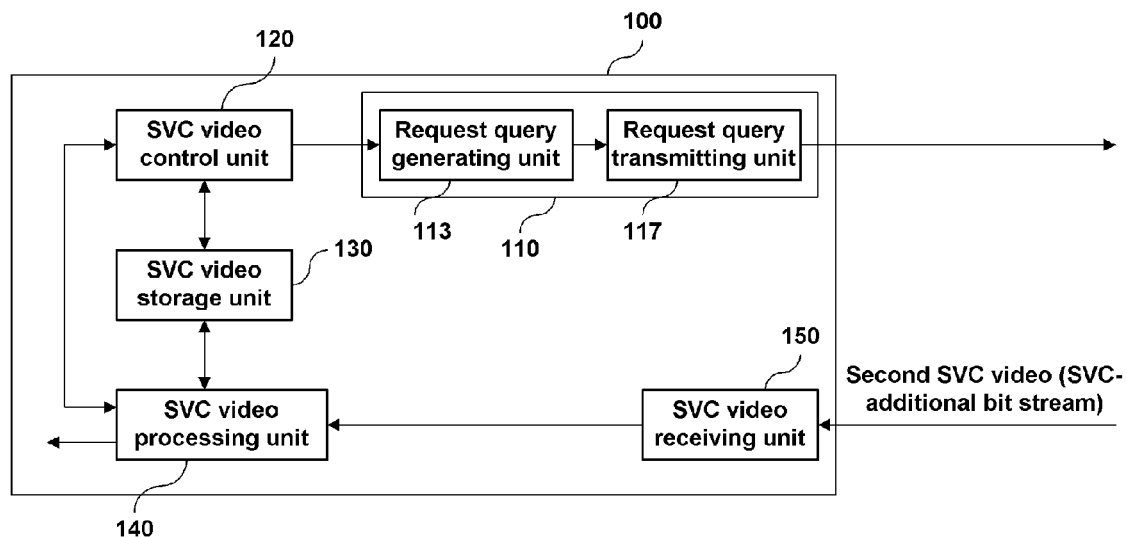
FIG. 2 is a control block diagram of a terminal apparatus according to an embodiment, which is included in the scalable video providing system according to the present invention.

As shown in FIG. 2, the terminal apparatus 100 includes an SVC video storage unit 130 in which a base layer svc video was previously stored, an SVC video processing unit 140 for, if a second SVC video is received from the SVC content providing server 200, processing the base layer svc video stored in the SVC video storage unit 130 and the received second SVC video and outputting a full svc video, an SVC video control unit 120 for, in the case in which the full svc video having a higher scalability than that of the base layer svc video that was previously stored in the SVC video storage unit 130 is to be displayed, outputting request content information for requesting the second SVC video that is further required based on the base layer svc video, and a request unit 110 for generating a request query to request the second SVC video based on the request content information and transmits the request query to the SVC content providing server 200 over the network 10.

Furthermore, the terminal apparatus 100 may further include an SVC video receiving unit 150.

The SVC video storage unit 130 is a storage unit for storing an SVC bit stream of the base layer SVC video(that is, the base layer svc video).

It is preferred that the base layer svc video be video of a low resolution, a low frame rate and a low picture quality.

The SVC video receiving unit 150 receives an SVC bit stream (SVC-added bit stream) of the second SVC video, streamed by the external SVC content providing server 200, from the external SVC content providing server 200 over the network 10, and outputs Network Abstraction Layer (NAL) units, included in a packet of the received SVC bit stream, to the SVC video processing unit 140.

In the case in which the full svc video having a higher scalability than that of the base layer svc video previously stored in the SVC video storage unit 130 is to be displayed, the SVC video control unit 120 controls the SVC video processing unit 140 to read the base layer svc video stored in the SVC video storage unit 130 and output request content information for requesting the second SVC video, which is further required, based on the base layer svc video to the request unit 110. In this case, the case in which the full svc video having a higher scalability than that of the previously stored base layer svc video is to be displayed may include, for example, a case in which a reproduction request is input to the SVC video control unit 120 when a user selects reproduction of the full svc video.

At this time, it is preferred that the full svc video be an improved video, which has the same contents and a high resolution, a high frame and a high picture quality when compared with the base layer svc video of a low resolution, a low frame rate and a low picture quality, and have a higher scalability than that of the base layer svc video.

Furthermore, the request content information output from the SVC video control unit 120 may include at least any one of content name information corresponding to the base layer svc video, content codec information corresponding to the base layer svc video, encoding parameter information corresponding to the base layer svc video, scalability information corresponding to the base layer svc video, and scalability information of the full svc video for which reproduction is requested.

The scalability information is described below.

The NAL unit defined in H.264 includes scalability information, including at least any one of its own resolution information, frame rate information, picture quality information, and layer number information. As the resolution information, frame rate information, picture quality information, and layer number information become higher, they represent a NAL unit contributing to a higher resolution, higher frame rate and higher picture quality.

Furthermore, it is preferred that the SVC video control unit 120 control the read timing of the SVC video processing unit 140, which will be described later on, so that the SVC video processing unit 140 reads a NAL unit of an SVC bit stream of the base layer svc video from the SVC video storage unit 130 on the basis of the reproduction timing of the full svc video, based on the scalability information of the full svc video output from the SVC video processing unit 140.

The request unit 110 requests the second SVC video from the external SVC content providing server 200 over the network 10. The request unit 110 includes a request query generating unit 113 and a request query transmitting unit 117.

The request query generating unit 113 generates a request query for requesting the second SVC video that is further required based on the request content information output from the SVC video control unit 120.

That is, the request query generating unit 113 generates a request query, including at least any one of content name information, content codec information, encoding parameter information and scalability information, corresponding to the base layer svc video, and scalability information of the full svc video for which reproduction is requested, based on the request content information.

The request query can have the following format.

| Content name | Content codec | Encoding parameter | Scalability information of base layer svc video | Scalability information of full svc video that is requested |
|---|---|---|---|---|

As described above, the request query generating unit 113 generates the request query, having the above-described format and requesting the second SVC video corresponding to the SVC-added bit stream for displaying the full svc video, which will be displayed based on the previously stored base layer svc video, and outputs the generated request query to the request query transmitting unit 117.

The request query transmitting unit 117 transmits the request query, generated from the request query generating unit 113, to the SVC content providing server 200 over the external network 10.

The SVC video processing unit 140 reads an SVC bit stream of the base layer svc video, stored in the SVC video storage unit 130, by the NAL unit. At this time, it is preferred that, under the control of the SVC video control unit 120, the SVC video processing unit 140 begin reading the base layer svc video from the SVC video storage unit 130, and the read timing when the SVC bit stream of the base layer svc video is read by the NAL unit be controlled.

Furthermore, the SVC video processing unit 140 aligns the SVC bit stream of the second SVC video (that is, SVC-added bit stream), which is streamed from the external SVC content providing server 200 through the SVC video receiving unit 150, and the SVC bit stream of the base layer svc video, which is read from the SVC video storage unit 130, to one and outputs an SVC bit stream of the full svc video.

Here, it is preferred that the second SVC video be an SVC video corresponding to an SVC bit stream, including NAL units that are further required in the SVC bit stream of the base layer svc video in order to display the improved full svc video of a high resolution, a high frame rate and a high picture quality based on the base layer svc video of a low resolution, a low frame rate and a low picture quality.

That is, the SVC video processing unit 140 aligns the NAL units of the SVC bit stream (that is, SVC-added bit stream) corresponding to the second SVC video, which is streamed from the external SVC content providing server 200 through the SVC video receiving unit 150, and the NAL units of the read SVC bit stream of the base layer svc video to one SVC bit stream on the basis of a time stamp. The SVC video processing unit 140 outputs the one SVC bit stream aligned as described above (that is, the SVC bit stream of the full svc video) to a reproduction processing unit (not shown).

The reproduction processing unit (not shown) is a processing function unit for displaying an SVC bit stream and performs a general processing routine, and a detailed construction and description thereof is omitted.

In the case in which the terminal apparatus 100 displays an improved full svc video not a base layer svc video of a low resolution, a low frame rate and a low picture quality, previously stored therein, the terminal apparatus 100 according to the present invention requests only a second SVC video, which is further required in order to display the improved full svc video based on the base layer svc video, from the SVC content providing server 200, receives the second SVC video, streamed by the SVC content providing server 200, from the SVC content providing server 200, and aligns the base layer svc video and the second SVC video. Accordingly, the terminal apparatus 100 can display the improved full svc video to be displayed.

A construction of the SVC content providing server 200 is described in detail below with reference to FIG. 3.

Figure 3:
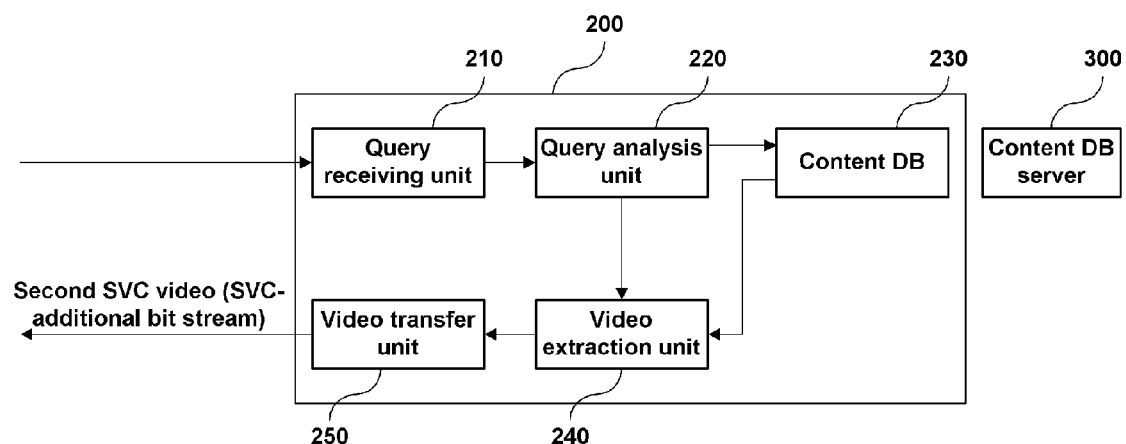
FIG. 3 is a control block diagram of an SVC content providing server according to an embodiment, which is included in the scalable video providing system according to the present invention.

As shown in FIG. 3, the SVC content providing server 200 includes a query receiving unit 210 that receives a specific request query from a specific terminal apparatus (hereinafter referred to as 'the terminal apparatus 100') over the external network 10, a query analysis unit 220 that, when a request query is received from the query receiving unit 210, searches for pertinent content based on the request query, a video extraction unit 240 that extracts a second SVC video corresponding to the remaining SVC video other than the base layer svc video, which was previously stored in the terminal apparatus 100, from the searched content based on the request query, and a video transfer unit 250 that transmits the second SVC video to the terminal apparatus 100 over the network 10.

Furthermore, the SVC content providing server 200 may further include a content DB 230.

When a request query is received from the terminal apparatus 100 over the network 10, the query receiving unit 210 outputs the received request query to the query analysis unit 220.

The query analysis unit 220 searches for pertinent content (that is, a full svc video) based on content name information, content codec information, and encoding parameter information, which correspond to a base layer svc video included in the request query received from the query receiving unit 210, and scalability information of the full svc video.

At this time, the query analysis unit 220 may search the content DB 230, included in the SVC content providing server 200, for the pertinent content (that is, the full svc video) or access a content DB server 300 disposed outside the SVC content providing server 200 and search the SVC content providing server 200 for the pertinent content (that is, the full svc video), as shown in FIG. 3.

The content DB 230 corresponds to a database in which pieces of content, corresponding to at least one scalable video having a different scalability, are previously stored. It is also possible to previously store pieces of content, corresponding to at least one scalable video having a different scalability, in the content DB server 300 disposed outside. It is preferred that each piece of content stored in the content DB 230 or the content DB server 300 include metadata, including at least any one of its own content codec information, encoding parameter information, and scalability information.

Here, the metadata may have the following format.

| Content codec | Encoding parameter | Scalability information |
| --- | --- | --- |

Hereinafter, a construction, including the content DB 230 in the SVC content providing server 200, is described in connection with an embodiment.

That is, the query analysis unit 220 may search the content DB 230 for content, corresponding to the content name information of the base layer svc video, and search for matching pertinent content (full svc video) by comparing metadata of pieces of content having the same name, and the scalability information of the full svc video included in the request query, the content codec information of the base layer svc video, and the encoding parameter information of the base layer svc video.

It has been considered that, in the case in which the same content is coded using an SVC method, a coding condition differs from a compressed SVC bit stream, that is, coded results depending on a codec that is actually used. That is, with respect to one piece of content, several SVC bit streams may exist in the content DB 230, and it is impossible to search for an optimal content (an SVC bit stream of a full svc video) from which a second SVC video suitable for being added to a base layer svc video can be extracted based on only a content name. To solve this problem, there is a need for a method of checking sub-bit streams of an SVC bit stream coded under the same environment, with respect to the same content.

The query analysis unit 220 searches for content corresponding to the scalability information of the full svc video in consideration of not only a content name but also a codec according to the same standard as that of the base layer svc video and encoding parameters. Accordingly, the query analysis unit 220 may search for an optimal content (the SVC bit stream of the full svc video) from which the second SVC video, which is suitable for being added to the base layer svc video, can be extracted.

The content DB 230 provides the pertinent content (the full svc video), searched for by the query analysis unit 220, to the video extraction unit 240.

The SVC video extraction unit 240 extracts a second SVC video, corresponding to the remaining SVC video other than the base layer svc video previously stored in the terminal apparatus 100, from the searched pertinent content (the full svc video) based on the request query.

That is, the SVC video extraction unit 240 may extract the remaining SVC bit streams corresponding to the remaining SVC video by removing NAL units depending on the scalability information of the base layer svc video from SVC bit streams of the searched full svc video based on scalability information of the base layer svc video, of pieces of information included in the request query input from the query analysis unit 220. Thus, the SVC video extraction unit 240 outputs the extracted remaining SVC bit stream (that is, the second SVC video) to the SVC video transmitting unit 250.

The video transfer unit 250 streams and transmits the second SVC video (that is, an SVC-added bit stream), received from the SVC video extraction unit 240, to the terminal apparatus 100 over the network 10.

When a request for a second SVC video corresponding to an SVC-added bit stream is received from the terminal apparatus 100 that is sought to display an improved full svc video based on a base layer svc video of a low resolution, a low frame rate and a low picture quality, previously stored, the SVC content providing server 200 according to the present invention may search for/extract a second SVC video, which is optimally added to the base layer svc video, and provides the searched/extracted second SVC video to the terminal apparatus 100.

As described above, in the case in which an improved full svc video not a base layer svc video of a low resolution, a low frame rate and a low picture quality, which was previously stored in the terminal apparatus 100, is to be displayed, the terminal apparatus 100, the SVC content providing server 200, and the scalable video providing system including the same according to the present invention may receive only a second SVC video, which is further required in order to display the full svc video based on the previously stored base layer svc video and streamed by the external SVC content providing server 200, from the external SVC content providing server 200 and align the base layer svc video and the second SVC video, so they can display the improved full svc video to be displayed.

As described above, in accordance with the terminal apparatus 100, the SVC content providing server 200, and the scalable video providing system including the same according to the present invention, in the case in which an improved full svc video is to be displayed, the entire full svc video is not streamed and received, but only a second SVC video that is further required is streamed and received, and the full svc video is then displayed. Accordingly, the data transfer rate at the time of streaming can be lowered effectively.

Furthermore, in accordance with the terminal apparatus 100, the SVC content providing server 200, and the scalable video providing system including the same according to the present invention, when searching a DB for a second SVC video that is further required, content corresponding to scalability information of a full svc video is searched for in consideration of not only a content name, but also a codec according to the same standard as that of a base layer svc video and encoding parameters. Thus, since an optimal second SVC video suitable for being added to the base layer svc video can be provided to the terminal apparatus 100, it is possible to maintain reliability of the second SVC video.

Figure 8:
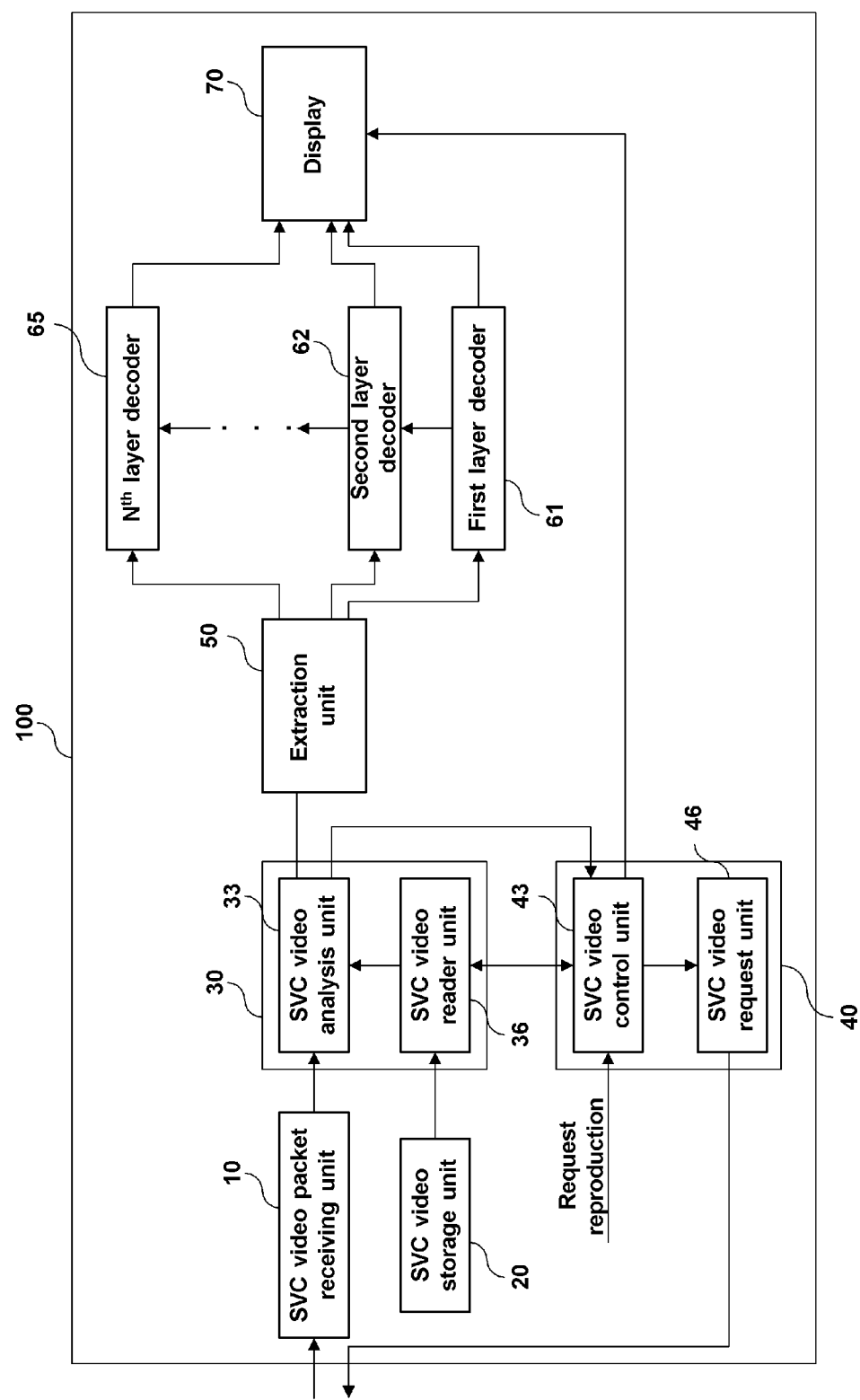
FIG. 8 is a control block diagram of a video displaying apparatus according to an embodiment, which is included in the system for streaming and displaying a scalable video according to the present invention.

Meanwhile, in the case in which the above-described terminal apparatus 100 receives a fourth SVC video, streamed by the SVC content providing server 200 and not related to the first, second and full svc videos, from the SVC content providing server 200, in order to display the fourth SVC video, an SVC bit stream of the fourth SVC video received through the SVC video receiving unit 150 is output to a reproduction processing unit (not shown) through the SVC video processing unit 140 and then experiences a general processing routine, so that video according to the fourth SVC video may be displayed on a display unit 70 (refer to FIG. 8).

Figure 4:
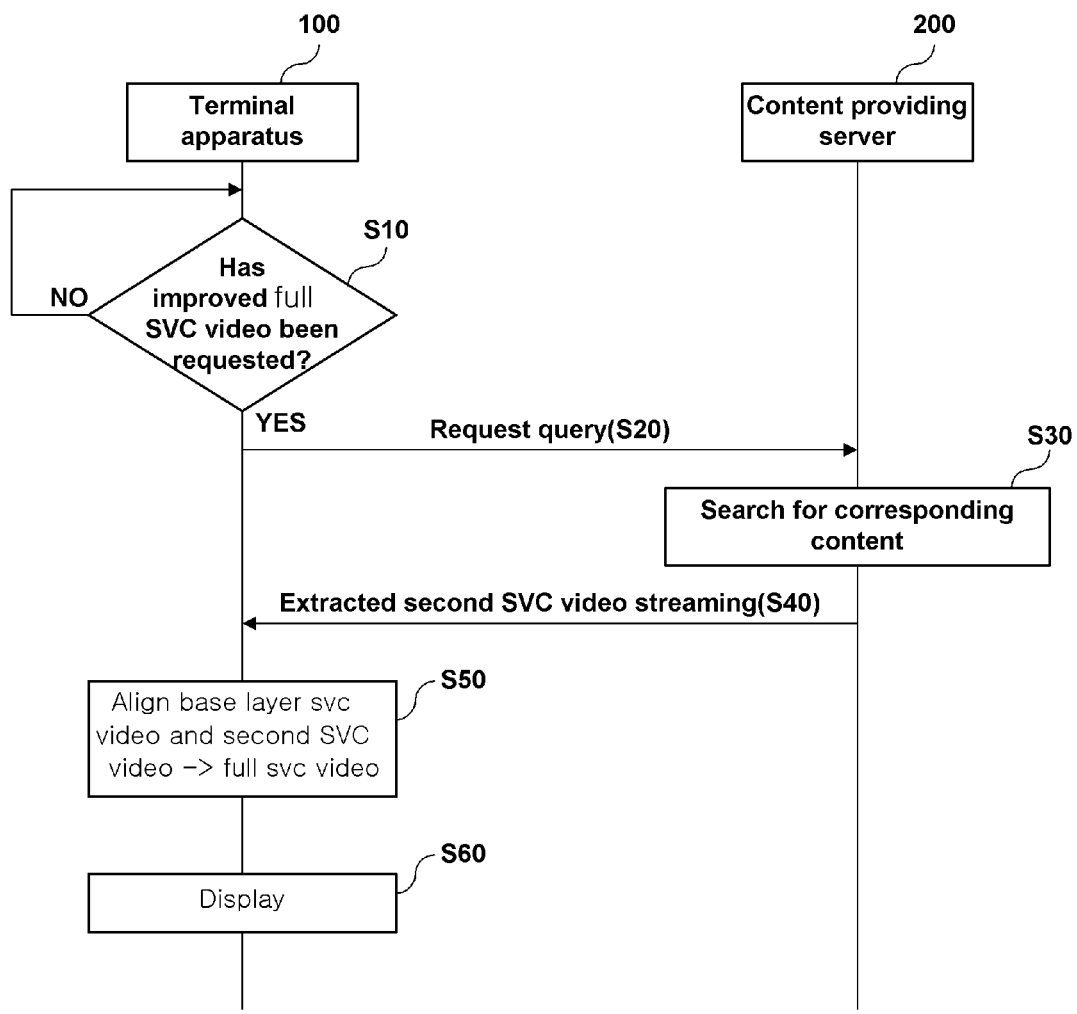
FIG. 4 is a control flowchart showing a scalable video providing method according to an embodiment of the present invention.

Hereinafter, the control flow of a scalable video providing method according to an embodiment of the present invention is described with reference to FIG. 4. Here, the above-described constructions shown in the FIGS. 1 and 2 are assigned the corresponding reference numerals, for convenience of description.

First, the terminal apparatus 100 previously stores a base layer SVC video (hereinafter referred to as a 'base layer svc video') of a low resolution, a low frame rate and a low picture quality. The terminal apparatus 100 then determines whether to display a full SVC video (hereinafter referred to as a 'full svc video') having a higher scalability than that of the base layer svc video (S10). If, as a result of the determination, the full svc video is to be displayed, the terminal apparatus 100 transmits a request query, which requests a enhancement layer svc bit stream (hereinafter referred to as a 'second SVC video'), to the SVC content providing server 200 based on the base layer svc video (S20).

The SVC content providing server 200 that has received the request query searches for pertinent content (the full svc video) based on the request query (S30), extracts the second SVC video from the searched content, streams the extracted second SVC video, and provides the streamed second SVC video to the terminal apparatus 100 (S40).

The terminal apparatus 100 aligns the streamed second SVC video and the base layer svc video previously stored therein to one and obtains the full svc video (S50). Accordingly, the terminal apparatus 100 may output and display the aligned full svc video (S60). Here, the scalable video includes an SVC video coded using an SVC method.

Figure 5:
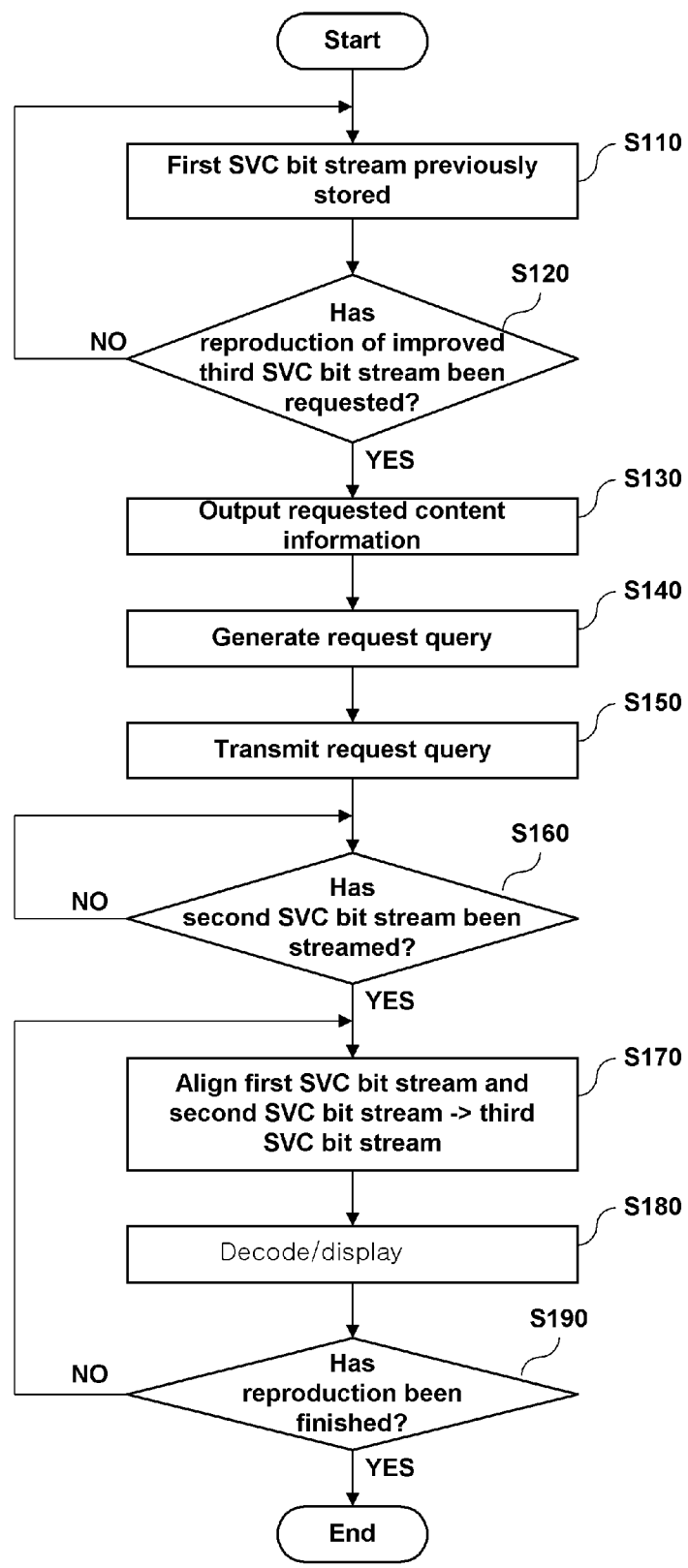
FIG. 5 is a control flowchart showing a control flow of the terminal apparatus in the scalable video providing method according to an embodiment of the present invention.

Hereinafter, a control flow according to a method of controlling the terminal apparatus 100, of the above-described control flow of the system, is described in more detail with reference to FIG. 5.

First, the terminal apparatus 100 previously stores a first SVC bit stream of a base layer SVC video (hereinafter referred to as a 'base layer svc video') of a low resolution, a low frame rate and a low picture quality (S110). Next, the terminal apparatus 100 determines whether to display a third SVC bit stream of an improved full SVC video (hereinafter referred to as a 'full svc video') having a higher scalability than that of the base layer svc video (S120). Here, it is preferred that the determination of the step S120 be made by determining whether a reproduction request has been input to the SVC video control unit 120 when a user selects the reproduction of the full svc video.

In the case in which the full svc video is to be displayed, the SVC video control unit 120 outputs request content information for requesting a second SVC video that is further required in order to the request unit 110 (S130). The request content information output from the SVC video control unit 120 may include at least any one of content name information corresponding to the base layer svc video, content codec information corresponding to the base layer svc video, encoding parameter information corresponding to the base layer svc video, scalability information corresponding to the base layer svc video, and scalability information of the full svc video for which reproduction is requested.

Furthermore, the SVC video control unit 120 may control the SVC video processing unit 140 to read the first SVC bit stream previously stored in the SVC video storage unit 130.

The request query generating unit 113 of the request unit 110 generates a request query for requesting the second SVC video that is further required based on the request content information received from the SVC video control unit 120 (S140). At this time, the request query includes at least any one of content name information, content codec information, encoding parameter information and scalability information, which correspond to the base layer svc video, and scalability information of the full svc video for which reproduction is requested.

The request query generated from the request query generating unit 113 is transmitted to the SVC content providing server 200 over the external network 10 (S150).

It is then determined whether a second SVC bit stream (that is, a requested SVC-added bit stream) of the second SVC video requested by the SVC content providing server 200 has been streamed and received (S160). If, as a result of the determination, the second SVC bit stream has been streamed and received, the SVC video processing unit 140 aligns NAL units of the streamed second SVC bit stream (the SVC-added bit stream) and NAL units of the first SVC bit stream of the read base layer svc video to one SVC bit stream on the basis of a time stamp (S170). Accordingly, the SVC video processing unit 140 obtains the one SVC bit stream (that is, a third SVC bit stream of the full svc video) and outputs the aligned SVC bit stream to a reproduction processing unit (not shown).

The reproduction processing unit (not shown) performs a general decoding processing routine, so the improved full svc video is displayed in the terminal apparatus 100 (S180). Next, in the case in which the reproduction of the full svc video is completed or finished by a user (S190), the reproduction of the full svc video is finished.

Figure 6:
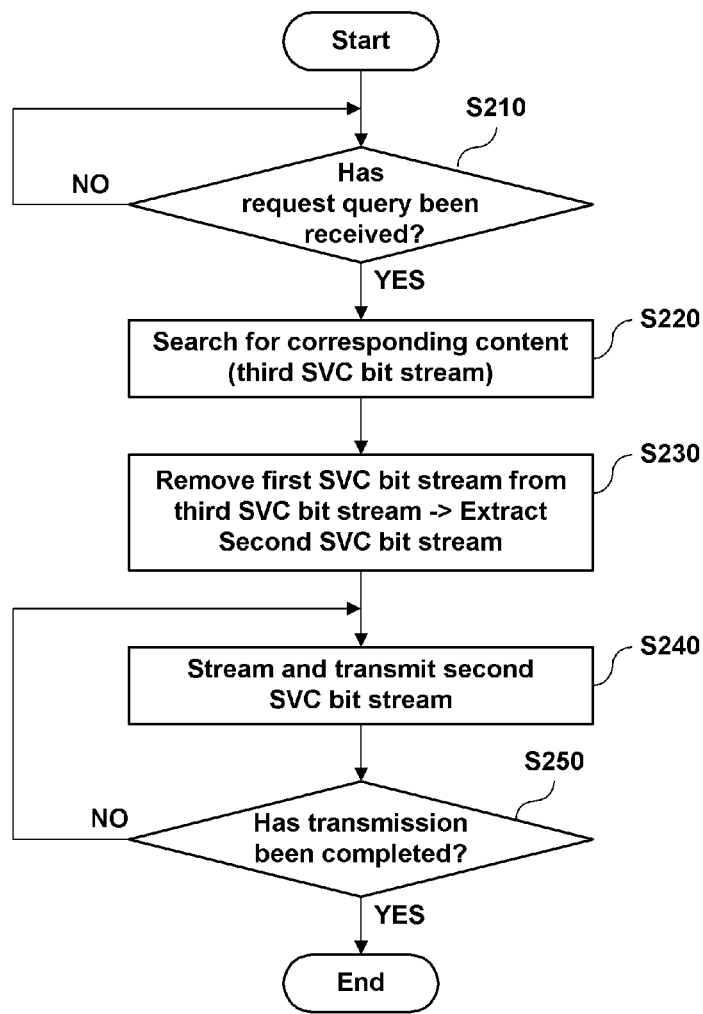
FIG. 6 is a control flowchart showing a control flow of the SVC content providing server in the scalable video providing method according to an embodiment of the present invention.

Hereinafter, a control flow according to a method of controlling the SVC content providing server 200, of the above-described control flow of the system, is described in more detail with reference to FIG. 6.

It is first determined whether a specific request query is received from a specific terminal apparatus (hereinafter referred to as the 'terminal apparatus 100') over the external network 10 (S210). If, as a result of the determination, the request query has been received, the query analysis unit 220 searches the content DB 230 for requested pertinent content based on the request query (S220). Each piece of content stored in the content DB 230 preferably includes metadata, including at least any one of its own content codec information, encoding parameter information, and scalability information.

In the step S220, the content DB 230 may be searched for content corresponding to content name information of the base layer svc video based on pieces of information included in the request query, and matching pertinent content (the full svc video) may be searched for by comparing metadata, included in the pieces of searched content having the same name, and scalability information of the full svc video included in the request query, content codec information of the base layer svc video, and encoding parameter information of the base layer svc video.

The pertinent content (that is, a third SVC bit stream of the full svc video), searched as described above, is output to the SVC video extraction unit 240. The SVC video extraction unit 240 extracts a second SVC bit stream of a second SVC video corresponding to the remaining SVC bit stream other than the first SVC bit stream from the full svc video based on the request query (S230). That is, the SVC video extraction unit 240 may extract the remaining SVC bit stream corresponding to the remaining SVC video by removing NAL units according to the scalability information of the base layer svc video from the third SVC bit stream of the searched full svc video based on scalability information of the base layer svc video, of the pieces of information included in the request query received from the query analysis unit 220.

The SVC video extraction unit 240 outputs the extracted remaining SVC bit stream, that is, the second SVC bit stream (an SVC-added bit stream) to the SVC video transmitting unit 250. The SVC video transmitting unit 250 streams the second SVC bit stream (that is, the SVC-added bit stream) and transmits the streamed second SVC bit stream to the terminal apparatus 100 over the network 10 (S240). Next, after the transmission is completed (S250), the streaming transmission of the SVC bit stream of the second SVC video(that is, the SVC-added bit stream) is finished.

As described above, in accordance with the scalable video providing method according to the present invention, when the terminal apparatus 100 is sought to display an improved full svc video not a base layer svc video of a low resolution, a low frame rate and a low picture quality, previously stored therein, the terminal apparatus 100 receives only a second SVC video, which is further required in order to display the full svc video based on the previously stored base layer svc video and streamed and provided by the external SVC content providing server 200, from the external SVC content providing server 200, and aligns the base layer svc video and the second SVC video. Accordingly, the terminal apparatus 100 may display the improved full svc video to be displayed.

As described above, in accordance with the scalable video providing method according to the present invention, in the case in which an improved full svc video is to be displayed, the entire full svc video is not streamed and received, but only a second SVC video that is further required is streamed and received and the full svc video is displayed. Accordingly, the data transfer rate at the time of streaming can be lowered effectively.

Furthermore, in accordance with the scalable video providing method according to the present invention, when searching a DB for a second SVC video that is further required, content corresponding to scalability information of a full svc video is searched for in consideration of not only a content name, but also a codec according to the same standard as that of the base layer svc video and encoding parameters. Thus, since an optimal second SVC video suitable for being added to the base layer svc video can be provided to the terminal apparatus 100, reliability of the second SVC video can be maintained.

Figure 7:
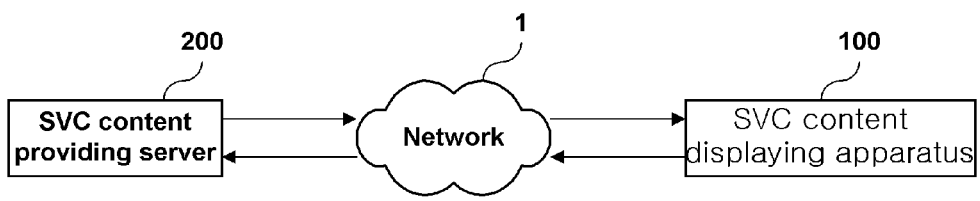
FIG. 7 is a schematic control block diagram of a system for streaming and displaying a scalable video according to an embodiment of the present invention.

FIG. 7 is a schematic control block diagram of a system for streaming and displaying a scalable video according to an embodiment of the present invention.

As shown in FIG. 7, the system for streaming and displaying a scalable video according to the present invention includes a providing server 200 for providing a scalable video, and a video displaying apparatus 100 for receiving the scalable video, streamed and provided by the providing server 200, from the providing server 200 over a network 1 and displaying the received scalable video.

The scalable video may include an SVC video coded using an SVC method. It is hereinafter assumed that the scalable video is an SVC video coded using the SVC method, the providing server 200 is an SVC content providing server 200 for streaming and providing an SVC video, and the video displaying apparatus 100 is an SVC content displaying apparatus 100 for displaying an SVC video.

The SVC content providing server 200 streams content corresponding to an SVC video coded using an SVC method and provides the streamed content over the network 1.

The SVC content providing server 200 streams SVC content, including the SVC video coded using an SVC method, and provides the streamed SVC content over the network 1. In the case in which additional NAL information for displaying a full svc video having a higher scalability than that of a base layer svc video, previously stored in the SVC content displaying apparatus 100, is received from the SVC content displaying apparatus 100, the SVC content providing server 200 may stream an SVC bit stream (that is, a second SVC video), corresponding to the received additional NAL unit information, and provide the streamed SVC bit stream to the SVC content displaying apparatus 100.

The SVC content displaying apparatus 100 is an displaying apparatus for previously storing a base layer SVC video (hereinafter referred to as a 'base layer svc video') and, in the case in which a full SVC video (hereinafter referred to as a 'full svc video') having a higher scalability than that of the previously stored base layer svc video is to be displayed, requesting a enhancement layer svc bit stream that is further required (hereinafter referred to as a 'second SVC video') from the SVC content providing server 200 based on the previously stored base layer svc video and displaying the full svc video based on the base layer svc video that was previously stored and the streamed second SVC video.

A construction of the SVC content displaying apparatus 100 is described in detail with reference to FIG. 8.

As shown in FIG. 8, the SVC content displaying apparatus 100 includes an SVC video storage unit 20 in which the base layer svc video is stored, a video processing unit 30 for reading the base layer svc video stored in the SVC video storage unit 20, aligning the second SVC video streamed from the external SVC content providing server 200 and the read base layer svc video to one, and outputting the full svc video, and a displaying control unit 40 for, in the case in which the full svc video having a higher scalability than that of the base layer svc video that was previously stored is to be displayed, requesting the second SVC video from the external SVC content providing server 200 based on the base layer svc video read by the video processing unit 30.

Furthermore, the SVC content displaying apparatus 100 may further include an SVC video packet receiving unit 10.

The SVC video storage unit 20 is a storage unit for previously storing an SVC bit stream of the base layer SVC video (that is, the base layer svc video).

It is preferred that the base layer svc video is video of a low resolution, a low frame rate and a low picture quality.

The SVC video packet receiving unit 10 receives the SVC bit stream of the second SVC video, which is streamed and provided by the external SVC content providing server 200, from the external SVC content providing server 200 over the network 1, and outputs NAL units, included in a packet of the received SVC bit stream, to the video processing unit 30.

The video processing unit 30 includes an SVC video analysis unit 33 and an SVC video reader unit 36.

The SVC video reader unit 36 reads the SVC bit stream of the base layer svc video, stored in the SVC video storage unit 20, by the NAL unit and outputs the read SVC bit stream to the SVC video analysis unit 33 to be described later on. It is preferred that, under the control of a SVC video control unit 43 of a displaying control unit 40, the SVC video reader unit 36 begin reading the base layer svc video from the SVC video storage unit 20, and the read timing when the SVC bit stream of the base layer svc video is read by the NAL unit be controlled.

The SVC video analysis unit 33 receives the SVC bit stream of the second SVC video, which is streamed and provided by the external SVC content providing server 200, through the SVC video packet receiving unit 10, and the read SVC bit stream of the base layer svc video output from the SVC video reader unit 36, aligns the SVC bit stream of the second SVC video and the SVC bit stream of the base layer svc video to one, outputs the SVC bit stream of the full svc video, and also outputs video information of the full svc video to the displaying control unit 40.

That is, the SVC video analysis unit 33 aligns NAL units of the SVC bit stream of the second SVC video, which is streamed and provided by the external SVC content providing server 200 through the SVC video packet receiving unit 10, and NAL units of the read SVC bit stream of the base layer svc video to one SVC bit stream on the basis of a time stamp. The SVC video analysis unit 33 outputs the one SVC bit stream (that is, the SVC bit stream of the full svc video), aligned as described above, to an extraction unit 50 to be described later on, analyzes the full svc video, and outputs scalability information, corresponding to the video information of the full svc video, to the displaying control unit 40.

Here, the scalability information is described below. The NAL unit defined in H.264 includes scalability information, including at least any one of its own resolution information, frame rate information, picture quality information, and layer number information. As the resolution information, frame rate information, picture quality information, and layer number information become higher, they represent a NAL unit contributing to a higher resolution, higher frame rate and higher picture quality.

The displaying control unit 40 includes the SVC video control unit 43 and a SVC video request unit 46.

The SVC video request unit 46 requests the second SVC video from the external SVC content providing server 200 over the network 1. It is preferred that this SVC video request unit 46 request the second SVC video by providing additional NAL unit information to the SVC content providing server 200 under the control of the SVC video control unit 43 to be described later on. Furthermore, the SVC video request unit 46 may request the second SVC video by providing scalability information about additional NAL unit information to the SVC content providing server 200.

It is preferred that the second SVC video is a SVC video corresponding to a SVC bit stream, including NAL units which are further required in the SVC bit stream of the base layer svc video, in order to display an improved full svc video of a high resolution, a high frame rate and a high picture quality based on the base layer svc video of a low resolution, a low frame rate and a low picture quality.

In the case in which it is sought to display the full svc video having a higher scalability than that of the base layer svc video previously stored in the SVC video storage unit 20, the SVC video control unit 43 controls the SVC video request unit 46 to request the second SVC video based on the base layer svc video read by the video processing unit 30 and also controls the read timing of the video processing unit 30 based on the video information of the full svc video processed in the video processing unit 30.

It is preferred that the full svc video be an improved video, which has the same contents and a high resolution, a high frame and a high picture quality when compared with the base layer svc video of a low resolution, a low frame rate and a low picture quality, and have a higher scalability than that of the base layer svc video.

Furthermore, the case in which the full svc video having a higher scalability than that of the previously stored base layer svc video is to be displayed may include, for example, a case in which a reproduction request is input to the SVC video control unit 43 when a user selects reproduction of the full svc video.

That is, in the case in which the full svc video, having a higher scalability than that of the base layer svc video previously stored in the SVC video storage unit 20, is to be displayed, the SVC video control unit 43 controls the SVC video reader unit 36 to read the base layer svc video stored in the SVC video storage unit 20 and also controls the SVC video request unit 46 to request the second SVC video by providing additional NAL unit information for the full svc video to the SVC content providing server 200 based on the base layer svc video read by the SVC video reader unit 36.

The SVC video control unit 43 also controls the read timing of the SVC video reader unit 36 so that the SVC video reader unit 36 reads the NAL units of the SVC bit stream of the base layer svc video from the SVC video storage unit 20 on the basis of the reproduction timing of the full svc video based on the scalability information of the full svc video input from the SVC video analysis unit 33.

In the case in which an improved full svc video not a base layer svc video, which has a low resolution, a low frame rate and a low picture quality and was previously stored, is to be displayed, the SVC content displaying apparatus 100 (that is, the video displaying apparatus) and the system for streaming and displaying a scalable video including the same according to the present invention receive only a second SVC video, which is streamed and further required based on the base layer svc video, and align the base layer svc video and the second SVC video. Accordingly, the improved full svc video to be displayed can be obtained.

The SVC content displaying apparatus 100 may further include the extraction unit 50, a plurality of layer decoders 61, 62 to 65, and the display unit 70.

The extraction unit 50 receives the SVC bit stream of the full svc video, output from the SVC video analysis unit 33, and provides NAL units of the full svc video to corresponding layer decoders of the plurality of layer decoders 61, 62 to 65 based on scalability information existing in the respective NAL units included in the SVC bit stream of the full svc video.

The plurality of layer decoders 61, 62 to 65 includes a plurality of layer decoders for decoding SVC bit streams of SVC video based on respective scalabilities. That is, the first layer decoder 61 of the plurality of layer decoders 61, 62 to 65 functions to decode the base layer of a SVC bit stream, and the second layer decoder 62 functions to decode a second enhancement layer of the SVC bit stream.

The SVC codec codes pieces of information, each representing a different resolution and picture quality, into other layer in order to provide a scalability with respect to a resolution and a picture quality other than a frame rate, and is performed by the decoder (the plurality of layer decoders 61, 62 to 65) or layer unit. The first layer decoder 61 of the lowest layer is a decoder compatible with H.264, and the decoders 62 to 65 of upper layers include functions defined in H.264 scalable extension. Video and information, decoded in a decoder of a lower layer (that is, the first layer decoder 61), are used in decoders of upper layers (that is, the second layer decoder 62 to the Nth layer decoder 65). Video decoded in a decoder of the highest layer is transferred to the display unit 70 and displayed thereon.

As described above, in the case in which an improved full svc video not a base layer svc video, which has a low resolution, a low frame rate and a low picture quality and was previously stored, is to be displayed, the SVC content displaying apparatus 100 (that is, the video displaying apparatus) and the system for streaming and displaying a scalable video including the same according to the present invention receive only a second SVC video, which is streamed and provided by the external SVC content providing server 200 and further required in order to display the full svc video based on the previously stored base layer svc video, from the external SVC content providing server 200, and align the base layer svc video and the second SVC video. Accordingly, the improved full svc video to be displayed can be displayed.

As described above, in accordance with the SVC content displaying apparatus 100 (that is, the video displaying apparatus) and the system for streaming and displaying a scalable video including the same according to the present invention, in the case in which an improved full svc video is to be displayed, the entire full svc video is not streamed and received, but only a second SVC video, further required in order to display the full svc video based on a base layer svc video previously stored, is streamed and received, and the full svc video is then displayed. Accordingly, the data transfer rate at the time of streaming can be lowered effectively.

Meanwhile, in the case in which the above-described SVC content displaying apparatus 100 receives a fourth SVC video, which is not concerned with the first, second and full svc videos and streamed and provided by the SVC content providing server 200, from the SVC content providing server 200 in order to display the fourth SVC video, a SVC bit stream of the fourth SVC video received through the SVC video packet receiving unit 10 is provided to the extraction unit 50 through the SVC video analysis unit 33 or a separate SVC video stream processing unit (not shown), decoded as in the prior art through the plurality of layer decoders 61, 62 to 65, and then displayed on the display unit 70.

Figure 9:
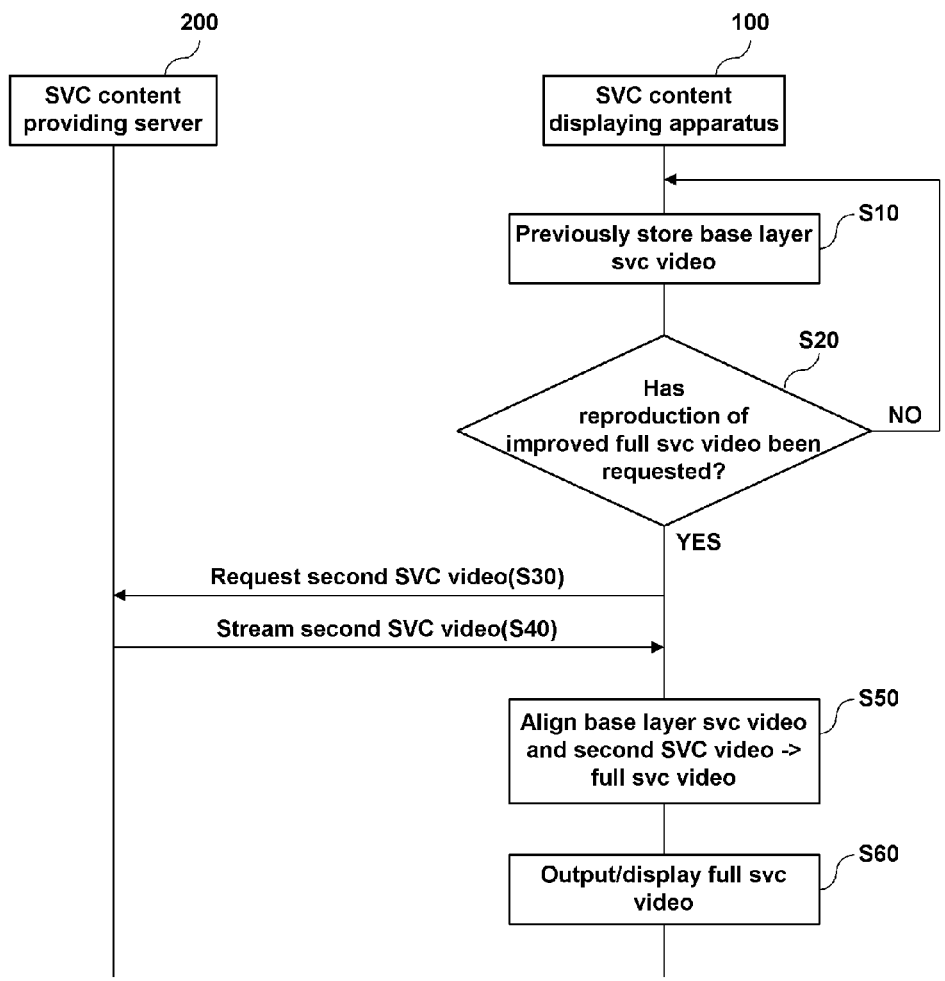
FIG. 9 is a control flowchart showing a method of streaming and displaying a scalable video according to an embodiment of the present invention.

Hereinafter, the control flow of a method of streaming and displaying a scalable video according to an embodiment of the present invention is described with reference to FIG. 9. Here, the above-described constructions shown in FIGS. 7 and 8 are assigned the corresponding reference numerals, for convenience of description.

First, the SVC content displaying apparatus 100 previously stores a base layer SVC video (hereinafter referred to as a 'base layer svc video') of a low resolution, a low frame rate and a low picture quality (S10). Next, the SVC content displaying apparatus 100 determines whether to display a full SVC video (hereinafter referred to as a 'full svc video') having a higher scalability than that of the base layer svc video (S20). If, as a result of the determination, the full svc video is to be displayed, the SVC content displaying apparatus 100 requests a enhancement layer svc bit stream (hereinafter referred to as a 'second SVC video') from the external SVC content providing server 200 based on the base layer svc video (S30).

The SVC content providing server 200, which has received the request for the second SVC video, streams the requested second SVC video, and provides the streamed second SVC video to the SVC content displaying apparatus 100 (S40). In the case in which additional NAL unit information for displaying a full svc video, having a higher scalability than that of the base layer svc video that was previously stored, is received from the SVC content displaying apparatus 100, it may be preferred that the SVC content providing server 200 recognize the additional NAL unit information as a request for the second SVC video, stream the received additional NAL units (that is, the second SVC video), and provide the streamed additional NAL units to the SVC content displaying apparatus 100.

The SVC content displaying apparatus 100 may align the streamed second SVC video and the previously stored base layer svc video to one in order to obtain a full svc video (S50). The SVC content displaying apparatus 100 then may output and display the aligned full svc video (S60).

Figure 10:
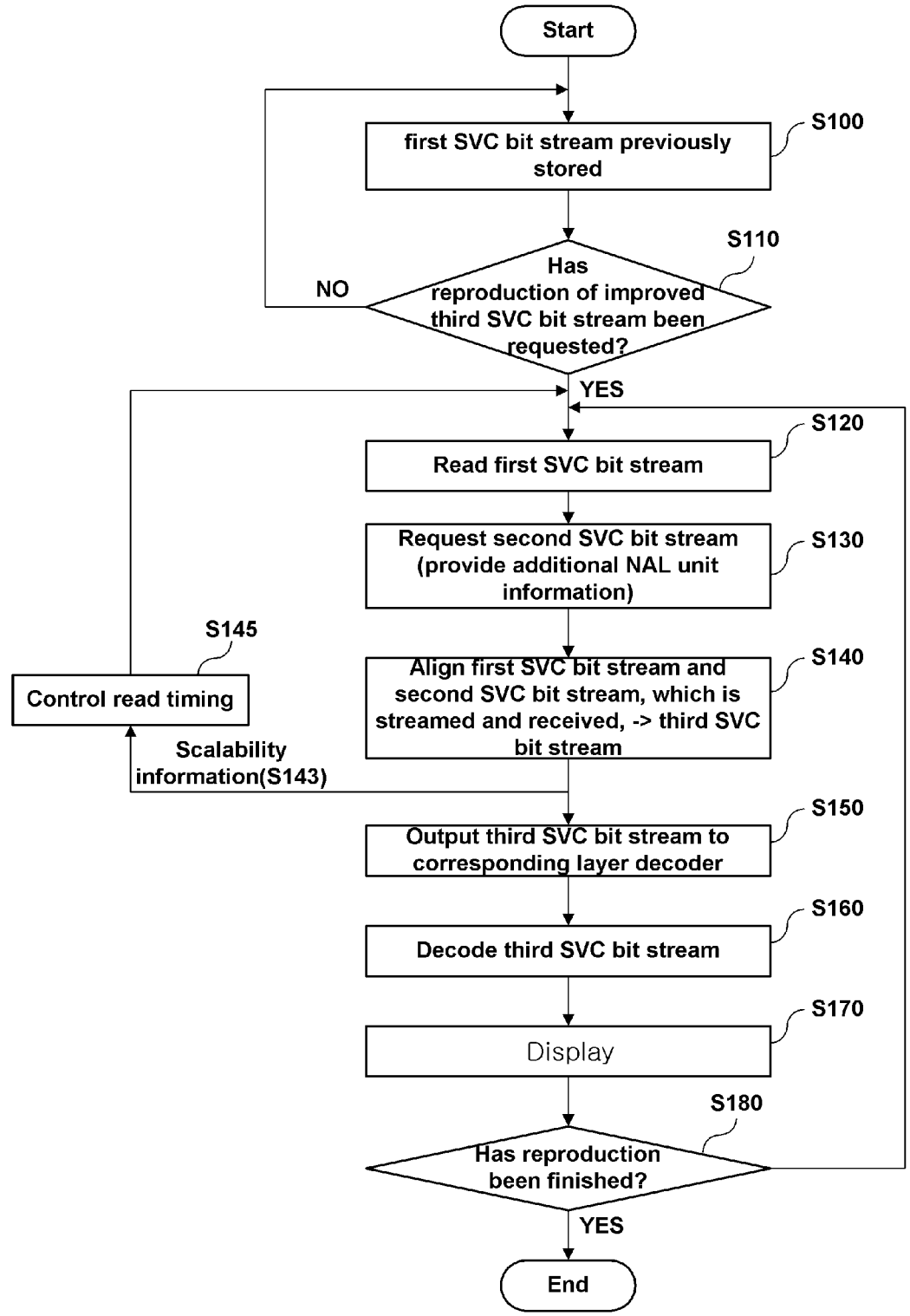
FIG. 10 is a control flowchart showing a scalable video displaying method of the video displaying apparatus according to an embodiment of the present invention.

Hereinafter, a method of displaying scalable video in the SVC content displaying apparatus 100, of the above-described control flow of the system, is described in more detail with reference to FIG. 10.

First, the SVC content displaying apparatus 100 previously stores a base layer SVC video (hereinafter referred to as a 'base layer svc video') of a low resolution, a low frame rate, and a low picture quality (S100). Next, the SVC content displaying apparatus 100 determines whether to display a full SVC video (hereinafter referred to as a 'full svc video') having a higher scalability than that of the base layer svc video (S110). Here, it is preferred that the determination in the step S110 be made by determining whether a reproduction request is input to the SVC video control unit 43 when a user selects reproduction of the full svc video.

If, as a result of the determination, the full svc video is to be displayed, the SVC video control unit 43 controls the SVC video reader unit 36 to read the base layer svc video that was previously stored in the SVC video storage unit 20 (S120). In response thereto, the SVC video reader unit 36 reads a SVC bit stream of the base layer svc video by the NAL unit and outputs the read SVC bit stream to the SVC video analysis unit 33. Meanwhile, the SVC video control unit 43 also controls the SVC video request unit 46 to request a second SVC video for the full svc video based on the base layer svc video read by the SVC video reader unit 36 (S130). At this time, the SVC video request unit 46 may request the second SVC video by providing additional NAL unit information that is further required in the SVC bit stream of the base layer svc video to the SVC content providing server 200 in order to display the full svc video.

When a SVC bit stream of the requested second SVC video is streamed and provided by the SVC content providing server 200, the SVC video analysis unit 33 aligns NAL units of the streamed SVC bit stream of the second SVC video and NAL units of the read SVC bit stream of the base layer svc video to one SVC bit stream on the basis of a time stamp (S140). Then, the SVC video analysis unit 33 outputs the aligned one SVC bit stream (that is, the SVC bit stream of the full svc video) to the extraction unit 50 to be described later on.

The extraction unit 50 outputs the respective NAL units of the full svc video to corresponding layer decoders of the plurality of layer decoders 61, 62 to 65 based on scalability information existing in the respective NAL units included in the output SVC bit stream of the full svc video (S150). In response thereto, the plurality of layer decoders 61, 62 to 65 decodes the NAL units respectively input thereto and provides them to the display unit 70 (S160). Thus, the decoded full svc video of a high resolution, a high frame rate and a high picture quality is displayed on the display unit 70 (S170). Next, in the case in which the reproduction of the full svc video is completed or finished by a user (S180), the reproduction of the full svc video is finished.

Meanwhile, after the above-described step S140, the SVC video analysis unit 33 may analyze the full svc video and output scalability information, corresponding to video information of the full svc video, to the SVC video control unit 43 (S143). In response thereto, the SVC video control unit 43 may control the read timing of the SVC video reader unit 36 so that the SVC video reader unit 36 reads the NAL units of the SVC bit stream of the base layer svc video from the SVC video storage unit 20 on the basis of the reproduction timing of the full svc video based on the scalability information of the full svc video received from the SVC video analysis unit 33 (S145).

As described above, in accordance with the scalable video displaying method of the SVC content displaying apparatus 100 (that is, the video displaying apparatus) and the method of streaming and displaying a scalable video including the same according to the present invention, in the case in which an improved full svc video not a base layer svc video, which has a low resolution, a low frame rate and a low picture quality and was previously stored, is to be displayed, only a second SVC video, which is further required in order to display the full svc video based on the previously stored base layer svc video, is received from the external SVC content providing server 200, and the base layer svc video and the second SVC video are aligned. Accordingly, the improved full svc video to be displayed can be displayed.

As described above, in accordance with the scalable video displaying method of the SVC content displaying apparatus 100, that is, the video displaying apparatus and the method of streaming and displaying a scalable video according to the present invention, in the case in which an improved full svc video is to be displayed, the entire full svc video is not streamed and received, but only a second SVC video, further required in order to display the full svc video based on a base layer svc video that was previously stored, is streamed and received, and the full svc video is then displayed. Accordingly, the data transfer rate at the time of streaming can be lowered effectively.

Although the specific embodiments of the present invention have been disclosed for illustrative purposes, the present invention is not limited to the above embodiments, and those skilled in the art will appreciate that various modifications or changes are possible, without departing from the gist of the invention as disclosed in the accompanying claims.

INDUSTRIAL APPLICABILITY

The scalable video providing and displaying system and the scalable video providing and displaying method of the present invention, in which, in the case in which an improved full svc video is to be displayed, the entire full svc video is not streamed and received, but only a second SVC video that is further required in order to display the full svc video based on a base layer svc video that was previously stored is streamed and received, thus effectively lowering the data transfer rate at the time of streaming and maintain reliability of the second SVC video, can make a considerable progress in terms of streaming environment of scalable video and the utilization of streaming network resources and are therefore very useful in terms of the industry.

The invention claimed is:
1. A scalable video providing system, comprising:
a content providing server for providing SVC video and
a terminal apparatus for receiving the SVC video streamed from the content providing server over a network with the terminal apparatus comprising;
a video storage unit for storing an SVC bit stream of a base layer SVC video;
a video control unit for determining if a full SVC video having a higher scalability than that of the base layer SVC video stored in the video storage unit is to be displayed;
a video processing unit responsive to the video control unit and to the content providing server for outputting a full SVC video; and a request unit for generating a request query including at least any one of content name information, content codec information, encoding parameter information and scalability information, which correspond to the base layer SVC video, and scalability information of the full SVC video for which reproduction is required for transmittal to the content providing server;

wherein said content providing server further comprises a query receiving unit and a query analysis unit for, when the request query is received, searches for required pertinent content based on the request query and generates a second SVC video representing an enhancement layer svc bit stream, corresponding to the remaining scalable video other than the base layer SVC video of the searched content, for transmittal to the video processing unit of the terminal apparatus for outputting a full SVC video from the video processing unit based upon the stored base layer SVC video and the second SVC video, with the full SVC video having a higher scalability than that of the base layer SVC video stored in the video storage unit and wherein the video processing unit reads the base layer svc video stored in the video storage unit, aligns Network Abstraction Layer (NAL) units of the second SVC video, which is streamed and provided by the content providing server, and NAL units of the read base layer svc video on the basis of a time stamp, and outputs the full SVC video.

2. The system of claim 1 wherein the terminal apparatus further comprises:
  a video storage unit in which a base layer SVC video is previously stored;
  an external content providing server for providing an enhancement layer svc bit stream to the video processing for processing the base layer SVC video stored in the video storage unit and the enhancement layer svc bit stream for outputting a full SVC video; and
  a video receiving unit for receiving a scalable video, streamed and provided by the external content providing server for outputting NAL units included in a packet of the scalable video to the video processing unit.

3. The system of claim 1 wherein the content providing server further comprises:
  a video extraction unit for extracting a enhancement layer svc bit stream corresponding to the remaining scalable video other than a base layer SVC video, which was previously stored in the terminal apparatus, from the searched content based on the request query; and
  a video transfer unit for transmitting the enhancement layer svc bit stream to the terminal apparatus over the network.

4. The system as claimed in claim 3 wherein the query analysis unit searches for the full SVC video, corresponding to the pertinent content, based on at least any one of the content name information, the content codec information, the encoding parameter information, and the scalability information of the requested full SVC video, which are included in the request query, and outputs pieces of information included in the request query to the video extraction unit.

5. The system as claimed in claim 4, wherein the video extraction unit extracts the enhancement layer svc bit stream corresponding to the remaining scalable video by removing NAL units according to the scalability information of the base layer SVC video from the searched full SVC video, based on the scalability information of the base layer SVC video of the pieces of information included in the request query received from the query analysis unit, and outputs the extracted enhancement layer SVC bit stream.

6. The system as claimed in claim 3, wherein the content providing server further comprises a content database (DB) for storing pieces of content corresponding to at least one scalable video having different scalabilities and providing the pertinent content, searched for by the query analysis unit, to the video extraction unit.

7. The system as claimed in claim 6, wherein the content stored in the content DB includes metadata, including at least any one of its own content codec information, encoding parameter information and scalability information.

8. The system as claimed in claim 3, further comprising a content database (DB) for storing pieces of content corresponding to at least one scalable video having different scalabilities and providing the pertinent content, searched for by the query analysis unit, to the video extraction unit.

9. A method for providing a scalable video using a system having a content providing server and a terminal apparatus with the scalable video including a Scalable Video Coding (SVC) coded video comprising the steps of:
  storing a base layer SVC video in the terminal apparatus,
  using the terminal apparatus to transmit a request query requesting an enhancement layer svc bit stream from the content providing server based on the base layer SVC video, with the request query including at least scalability information, which corresponds to the base layer SVC video, and scalability information of the full SVC video for which reproduction is required,
  using the content providing server for;
  searching for required pertinent content based on the request query,
  extracting the enhancement layer SVC bit stream, corresponding to the remaining scalable video other than the base layer SVC video of the searched content, and
  providing the extracted enhancement layer SVC bit stream to the terminal apparatus;
  wherein the request query includes at least any one of content name information, content codec information, encoding parameter information and scalability information, which correspond to the base layer SVC video, and scalability information of the full SVC video for which reproduction is required;
  wherein the searching step includes the step of searching for a full SVC video corresponding to the pertinent content, based on at least any one of content name information, content codec information, encoding parameter information, and scalability information of a full SVC video, which are included in the request query and
  wherein the extracting step includes the step of extracting the enhancement layer svc bit stream corresponding to the remaining scalable video by removing NAL units according to the scalability information of the base layer SVC video from the full SVC video, based on the scalability information of the base layer SVC video included in the request query.

10. The method as claimed in claim 9, wherein the content includes metadata, including at least any one of its own content codec information, encoding parameter information and scalability information.

11. A system for streaming and displaying a scalable video, comprising:
  a providing server for providing the scalable video; and
  a video displaying apparatus, comprising a video storage unit containing a previously stored base layer SVC video previously, a video processing unit for reading the base layer SVC video stored in the video storage unit, with the providing server streaming an enhancement layer SVC bit stream to the video processing unit based on the base layer SVC video for outputting one full SVC video, alignment means for aligning the enhancement layer SVC bit stream and the read base layer SVC video and a displaying control unit for displaying said one full SVC video having a higher scalability than that of the base layer SVC video previously stored is to be displayed, requesting the enhancement layer svc bit stream from the providing server based on the base layer SVC video read by the video processing unit;

wherein in the case in which additional NAL unit information for displaying the full svc video, having a higher scalability than that of the base layer svc video that previously stored, is received from the video displaying apparatus, the providing server streams the second SVC video corresponding to the received additional NAL unit information and provides the streamed second SVC video to the video displaying apparatus;

wherein the displaying control unit comprises:

a video request unit for requesting the enhancement layer svc bit stream from the external providing server; and a video control unit for, in the case in which the full SVC video having a higher scalability than that of the base layer SVC video previously stored is to be displayed, controlling the video request unit to request the enhancement layer svc bit stream based on the base layer SVC video read by the video processing unit, and controlling a read timing of the video processing unit based on video information of the full SVC video processed in the video processing unit, and wherein the video processing unit comprises:

a video reader unit for reading the base layer SVC video stored in the video storage unit; and a video analysis unit for aligning the enhancement layer svc bit stream, streamed and provided by the external providing server, and the base layer SVC video read by the video reader unit to one, outputting the full SVC video, and outputting video information of the full SVC video to the displaying control unit and wherein the video analysis unit and wherein said video analysis unit outputs the full svc video in which NAL units of the second SVC video, streamed and provided by the external providing server, and NAL units of the read base layer svc video are aligned on the basis of a time stamp, analyzes the full svc video, and outputs scalability information corresponding to video information of the full svc video to the displaying control unit.

12. The system as claimed in claim 11, further comprising:

a plurality of layer decoders for decoding scalable videos in response to respective scalabilities; and an extraction unit for receiving the full SVC video from the video processing unit and providing the full SVC video to a layer decoder, corresponding to a scalability of the full SVC video, of the plurality of layer decoders.

13. The system as claimed in claim 11, wherein, in the case in which the third SVC scalable video having a higher scalability than that of the first SVC scalable video previously stored is to be displayed, the video control unit of the displaying control unit controls the video request unit of the displaying control unit to request the second SVC video by providing additional NAL unit information for the second SVC video to the external providing server based on the base layer svc video read by the video processing unit, and controls the video reader unit of the video processing unit to read the NAL units of the base layer svc video from the video storage unit on the basis of a reproduction timing of the full svc video based on the scalability information of the full svc video input from the video analysis unit.

14. The system as claimed in claim 13, further comprising a video packet receiving unit for receiving a scalable video streamed and provided by the external providing server and outputting NAL units included in a packet of the scalable video to the video analysis unit.

15. The system as claimed in claim 14, wherein the scalability information includes at least any one of resolution information, frame rate information, picture quality information, and layer number information of the corresponding scalable video.

* * * * *